United States Patent
Podschwadt

(10) Patent No.: US 12,529,420 B2
(45) Date of Patent: Jan. 20, 2026

(54) ELECTRIC DRIVE UNIT HAVING AN OIL GUIDE

(71) Applicant: Schaeffler Technologies AG & Co. KG, Herzogenaurach (DE)

(72) Inventor: Maximilian Podschwadt, Saline, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/524,246

(22) Filed: Nov. 30, 2023

(65) Prior Publication Data

US 2025/0180110 A1    Jun. 5, 2025

(51) Int. Cl.
| F16H 57/04 | (2010.01) |
| F16H 3/66  | (2006.01) |
| F16H 57/08 | (2006.01) |

(52) U.S. Cl.
CPC ......... *F16H 57/0479* (2013.01); *F16H 3/663* (2013.01); *F16H 57/082* (2013.01); *F16H 2200/0021* (2013.01)

(58) Field of Classification Search
CPC ......... F16H 57/04–0424; F16H 57/082; F16H 57/0479
See application file for complete search history.

(56) References Cited

U.S. PATENT DOCUMENTS

| 4,968,157 A | 11/1990 | Chiba |
| 10,801,606 B2 | 10/2020 | Dellal et al. |
| 2013/0095974 A1 * | 4/2013 | Imai ........................... F02C 7/36 475/159 |
| 2016/0377167 A1 * | 12/2016 | Sheridan ............... F16H 57/043 60/226.1 |
| 2021/0293327 A1 * | 9/2021 | Wilson ................ F16H 57/0479 |
| 2021/0394600 A1 * | 12/2021 | Absenger ............... H02K 7/116 |

FOREIGN PATENT DOCUMENTS

| DE | 102005054084 A1 | 7/2007 |
| DE | 102010051041 A1 | 1/2012 |
| DE | 102015223566 A1 | 6/2017 |
| DE | 102016211226 B3 | 6/2017 |
| DE | 102016220404 A1 | 3/2018 |
| DE | 102017127617 A1 | 5/2018 |
| DE | 102017102527 A1 | 8/2018 |
| JP | 2005083491 A | 3/2005 |
| WO | WO-2024013992 A1 * | 1/2024 |

* cited by examiner

*Primary Examiner* — Ernesto A Suarez
*Assistant Examiner* — Lillian T Nguyen
(74) *Attorney, Agent, or Firm* — Price Heneveld LLP

(57) ABSTRACT

A vehicle includes an electric drive unit. The electric drive unit includes a motor, planetary gearset, differential carrier, and oil guide. The motor drives rotation of a rotor shaft. The planetary gearset includes a sun gear that rotates together with the rotor shaft about an axis, and planet gears that interface with the sun gear and revolve about the axis. Receiving spaces are defined between the planet gears. The differential carrier houses differential gears and is coupled with the planet gears, such that revolution of the planet gears rotates the differential carrier about the axis. The oil guide is coupled to the differential carrier and has guide arms within the corresponding receiving spaces. The oil guide rotates with the differential carrier, and the guide arms intercept oil propelled from the sun gear and convey the oil toward the differential gears housed by the differential carrier.

15 Claims, 11 Drawing Sheets

ELECTRIC DRIVE UNIT HAVING AN OIL GUIDE

FIELD OF THE DISCLOSURE

The present disclosure generally relates to an electric drive unit, such as an electric drive unit for a vehicle. More specifically, the present disclosure relates to an oil guide for use in an electric drive unit.

BACKGROUND OF THE DISCLOSURE

Electric drive units often include a transmission with various gears. Gears and other components of electric drive units require cooling and lubrication.

SUMMARY OF THE DISCLOSURE

According to a first aspect of the present disclosure, a vehicle includes an electric drive unit for powering movement of the vehicle. The electric drive unit includes a motor, a planetary gearset, a differential carrier, and an oil guide. The motor is configured to drive rotation of a rotor shaft. The planetary gearset includes a sun gear operably coupled to the rotor shaft, such that the sun gear and the rotor shaft are configured to rotate together at a common rate of rotation about an axis, and a plurality of planet gears that interface with the sun gear and are configured to revolve about the axis. Each of the planet gears is circumferentially offset from two adjacent planet gears, respectively, such that a plurality of receiving spaces are defined circumferentially between the plurality of planet gears. The differential carrier houses differential gears and is operably coupled with the plurality of planet gears, such that revolution of the plurality of planet gears rotates the differential carrier about the axis. The oil guide is coupled to the differential carrier and has a plurality of guide arms disposed within the corresponding plurality of receiving spaces. The oil guide is configured to rotate with the differential carrier and the guide arms are configured to intercept oil propelled radially outboard from the sun gear and convey the oil axially toward the differential gears housed by the differential carrier.

Embodiments of the first aspect of the disclosure can include any one or a combination of the following features:
  at least one of the plurality of guide arms of the oil guide includes an inner surface that is configured to intercept and convey the oil;
  the inner surface has a concave profile;
  the inner surface includes a tapered portion that tapers radially outboard as the tapered portion of the inner surface extends axially towards the differential gears;
  the oil guide comprises a connector ring from which the plurality of guide arms extend to axially distal ends, wherein the connector ring is nearer than the axially distal ends of the plurality of guide arms to the differential gears;
  the oil guide is an integrally formed single unitary body;
  a differential plate coupled to the differential carrier axially between the differential gears and the sun gear and configured to cooperate with the differential carrier to house the differential gears, wherein the differential plate defines a plurality of apertures that are aligned with a corresponding plurality of guide arms, such that oil conveyed toward the differential gears by the plurality of guide arms flows through the plurality of apertures defined by the differential plate to the differential gears;
  an oil distributor housed within the differential carrier and coupled with a cross pin that extends within the differential carrier, such that the differential plate is positioned axially between the oil guide and the oil distributor and the oil distributor is configured to rotate with the differential carrier about the axis, the oil distributor having a plurality of conduit portions that are axially aligned with the respective plurality of apertures defined by the differential plate and a plurality of collecting portions respectively adjacent to the plurality of conduit portions, wherein the conduit portions are configured to receive oil that is conveyed through the plurality of apertures by the corresponding plurality of guide arms and convey the oil axially to the collecting portions, and the collecting portions are configured to collect and distribute the oil to the differential gears as the oil distributor rotates about the axis; and
  the plurality of planet gears includes a first planet gear, a second planet gear, and a third planet gear positioned circumferentially between the first and second planet gears, the plurality of receiving spaces includes a first receiving space defined circumferentially between the first and second planet gears, a second receiving space defined circumferentially between the second and third planet gears, and a third receiving space defined circumferentially between the first and third planet gears, and the plurality of guide arms include a first guide arm disposed circumferentially between the first and second planet gears in the first receiving space, a second guide arm disposed circumferentially between the second and third planet gears in the second receiving space, and a third guide arm disposed circumferentially between the first and third planet gears in the third receiving space.

According to a second aspect of the present disclosure, an electric drive unit includes a motor, a planetary gearset, a differential carrier, and an oil guide. The motor is configured to drive rotation of a rotor shaft. The planetary gearset includes a plurality of planet gears including a first planet gear and a second planet gear and a sun gear that interfaces with the plurality of planet gears and that is operably coupled with the rotor shaft such that rotation of the rotor shaft drives rotation of the sun gear. The first and second planet gears are circumferentially offset from each other with respect to an axis of rotation of the sun gear, such that a receiving space is defined circumferentially between the first and second planet gears. The first and second planet gears are configured to revolve about the axis of rotation of the sun gear. The differential carrier houses differential gears and is operably coupled with the plurality of planet gears, such that revolution of the first and second planet gears rotates the differential carrier about the axis of rotation of the sun gear. The oil guide is coupled to the differential carrier and has a guide arm disposed within the receiving space circumferentially between the first and second planet gears and is configured to intercept oil propelled radially outboard from the sun gear and convey the oil axially toward the differential gears housed by the differential carrier.

Embodiments of the second aspect of the disclosure can include any one or a combination of the following features:
  the guide arm of the oil guide includes an inner surface that is configured to intercept and convey the oil;
  the inner surface has a concave profile;
  the inner surface includes a tapered portion that tapers radially outboard as the tapered portion of the inner surface extends axially towards the differential gears;

a differential plate coupled to the differential carrier axially between the differential gears and the sun gear and configured to cooperate with the differential carrier to house the differential gears, wherein the differential plate defines an aperture that is aligned with the guide arm, such that oil conveyed toward the differential gears by the guide arm flows through the aperture defined by the differential plate to the differential gears;

the oil guide comprises a connector ring from which the guide arm extends axially, wherein the connector ring abuts the differential plate;

an oil distributor housed within the differential carrier and coupled with a cross pin of a differential, such that the differential plate is positioned axially between the oil guide and the oil distributor and the oil distributor is configured to rotate with the differential carrier about the axis of rotation of the sun gear; and the oil distributor includes a conduit portion that is aligned with the aperture defined by the differential plate, the conduit portion being configured to axially convey oil received through the aperture.

According to a third aspect of the present disclosure, a transmission assembly includes a planetary gearset, a carrier, and an oil guide. The planetary gearset includes first and second planet gears that interface with a sun gear and are configured to revolve about an axis of rotation of the sun gear. The first and second planet gears are circumferentially offset from each other with respect to the axis of rotation of the sun gear to define a receiving space. The carrier is operably coupled with at least one of the first and second planet gears, such that revolution of the first and second planet gears rotates the carrier about the axis of rotation of the sun gear. The oil guide is coupled to the carrier and has a guide arm that is disposed within the receiving space circumferentially between the first and second planet gears and is configured to intercept oil propelled radially outboard from the sun gear and convey the oil axially.

Embodiments of the third aspect of the disclosure can include any one or a combination of the following features:

the carrier is a differential carrier; and the guide arm includes an inner surface that is configured to intercept and convey the oil, and the inner surface includes a tapered portion that tapers radially outboard as the tapered portion of the inner surface extends axially.

These and other features, advantages, and objects of the present disclosure will be further understood and appreciated by those skilled in the art by reference to the following specification, claims, and appended drawings.

Figure 1:
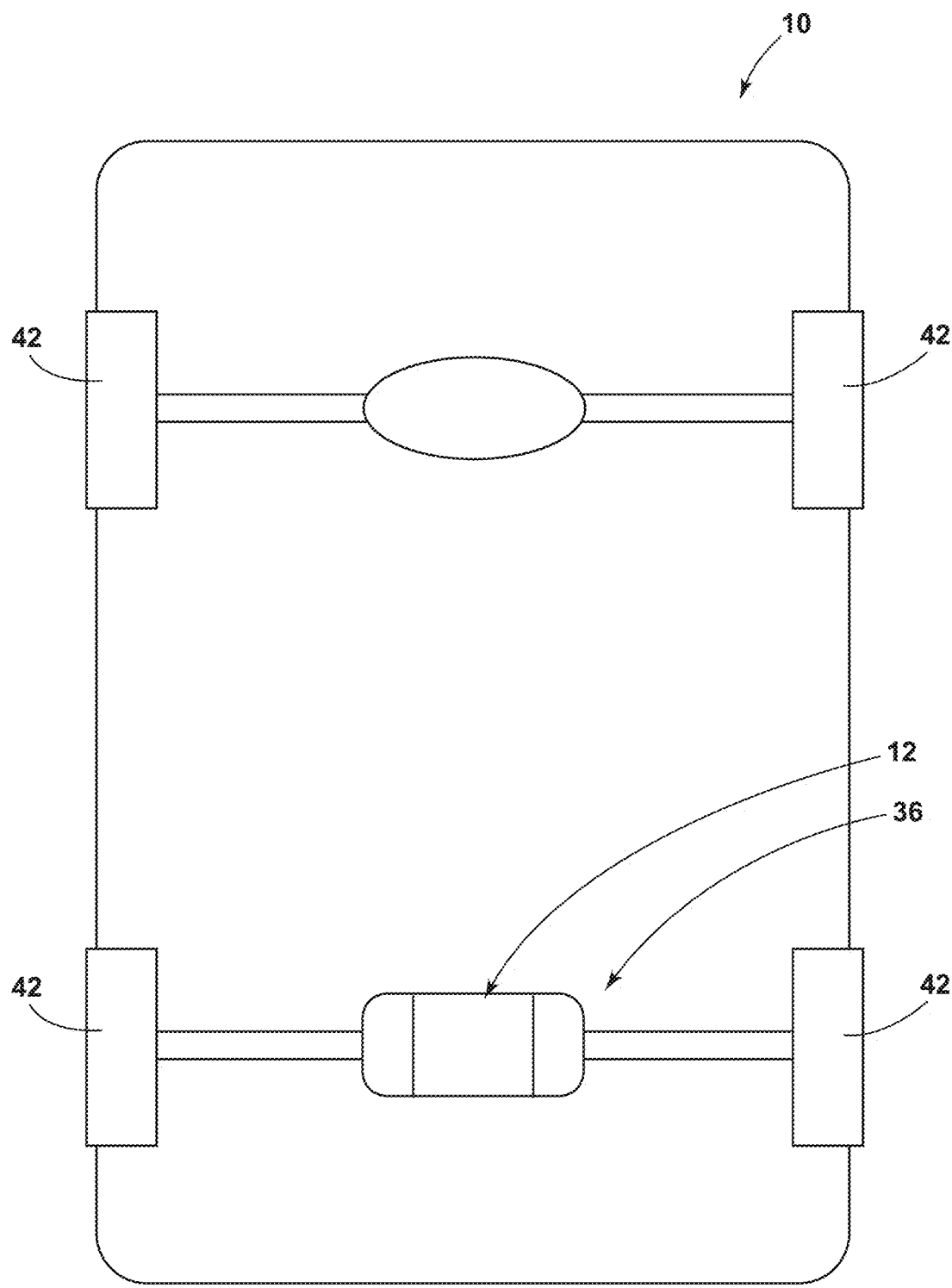
FIG. 1 is a schematic view of a vehicle that includes an electric drive unit, according to one embodiment.
Figure 2:
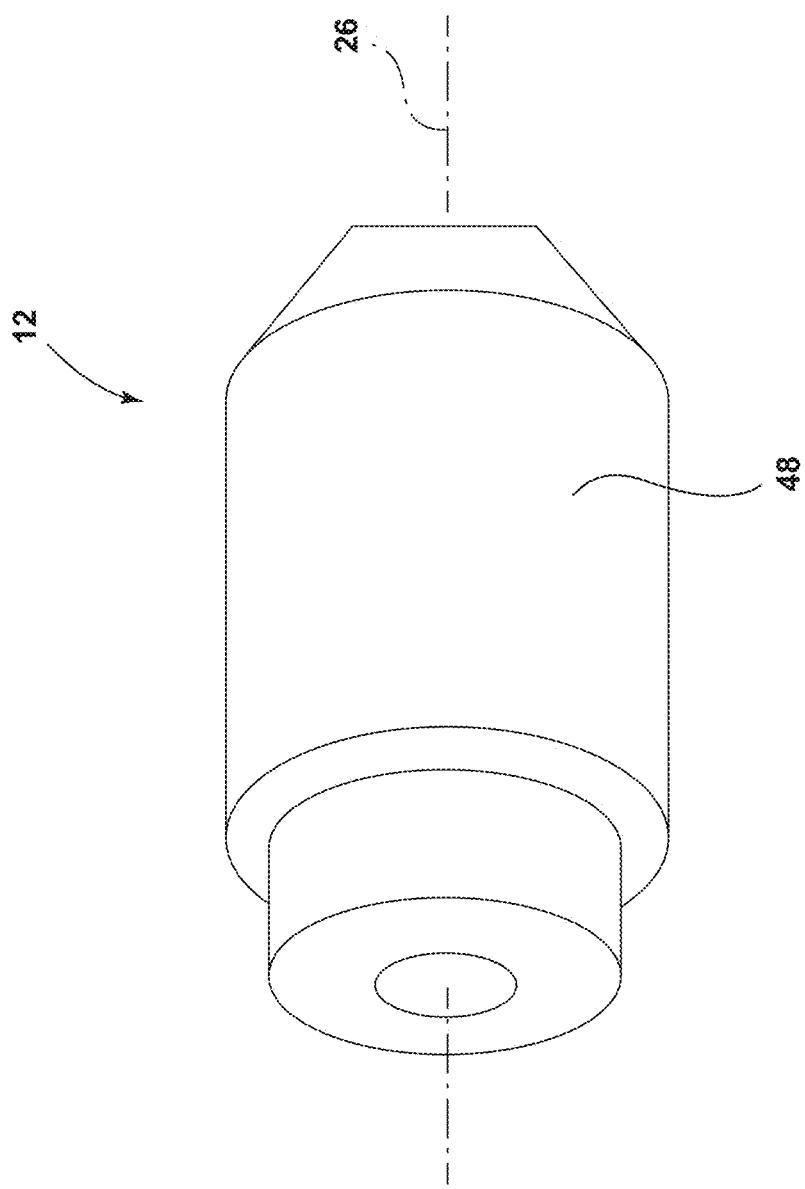
FIG. 2 is a perspective view of an electric drive unit, according to one embodiment.
Figure 3:
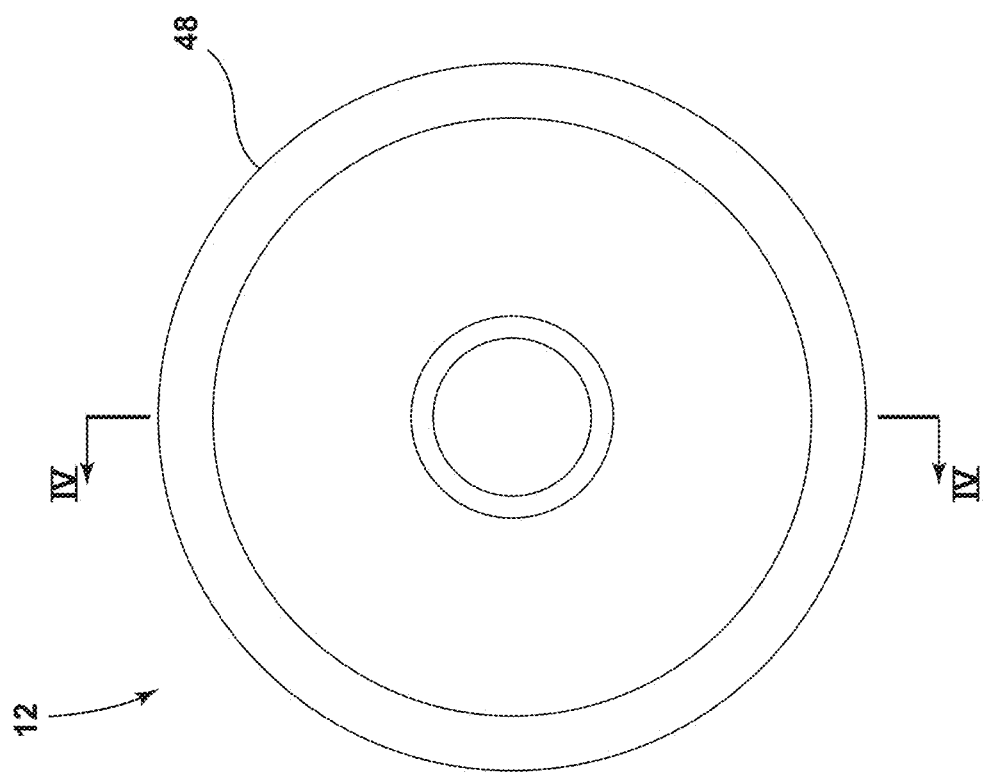
FIG. 3 is a side elevational view of the electric drive unit, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a rotor shaft configured to rotate in operation of the apparatus described herein. Further, the term "radial" and derivatives thereof, such as "radially," shall be understood in relation to the axis of the aforementioned rotor shaft. For example, "radially outboard" refers to further away from the axis, while "radially inboard" refers to nearer to the axis. The term "circumferential" and derivatives thereof, such as "circumferentially," shall be understood in relation to the axis of the aforementioned rotor shaft.

Referring now to FIGS. 1-11, a vehicle 10 includes an electric drive unit 12 for powering movement of the vehicle 10. The electric drive unit 12 includes a motor 14, a planetary gearset 16, a differential carrier 18, and an oil guide 20. The motor 14 is configured to drive rotation of a rotor shaft 22. The planetary gearset 16 includes a sun gear 24 that is operably coupled to the rotor shaft 22, such that the sun gear 24 and the rotor shaft 22 are configured to rotate together at a common rate of rotation about an axis 26. The planetary gearset 16 includes a plurality of planet gears 28 that interface with the sun gear 24 and that are configured to revolve about the axis 26. Each of the planet gears 28 is circumferentially offset from two adjacent planet gears 28, respectively, such that a plurality of receiving spaces 30 are defined circumferentially between the plurality of planet gears 28. The differential carrier 18 houses differential gears 32 and is operably coupled with the plurality of planet gears 28, such that revolution of the plurality of planet gears 28 rotates the differential carrier 18 about the axis 26. The oil guide 20 is coupled to the differential carrier 18. The oil guide 20 includes a plurality of guide arms 34 that are disposed within the corresponding plurality of receiving spaces 30. The oil guide 20 is configured to rotate with the differential carrier 18, and the guide arms 34 are configured to intercept oil that is propelled radially outward from the sun gear 24 and convey the oil axially toward the differential gears 32 housed by the differential carrier 18.

Referring now to FIG. 1, the vehicle 10 is illustrated. The vehicle 10 may be an electric vehicle and/or a hybrid electric vehicle. In the embodiment illustrated in FIG. 1, the vehicle 10 includes the electric drive unit 12. As illustrated, the electric drive unit 12 is a portion of an electric axle assembly 36 of the vehicle 10. The electric drive unit 12 includes an electric motor 14, which includes a stator 38 and a rotor 40 that is configured to drive rotation of the rotor shaft 22, in various embodiments. The rotor shaft 22 can be operably coupled with at least one wheel 42 of the vehicle 10, such that rotation of the rotor shaft 22 drives rotation of the at least one wheel 42 in operation of the electric drive unit 12. In various implementations, the electric drive unit 12 of the vehicle 10 includes a transmission 44. The transmission 44 can include a gearset, such as a planetary gearset 16 and/or a differential 46. The gearset may be configured to interface with the rotor shaft 22 and the differential 46, as described further herein, and the differential 46 may be configured to interface with half shafts of the vehicle 10 that are coupled with the wheels 42 of the vehicle 10. As such, rotation of the rotor shaft 22 by the electric motor 14 can drive rotation of the half shafts and the attached wheels 42 of the vehicle 10 via the operable coupling of the half shafts to the rotor shaft 22 by the gearset and the differential 46.

Referring now to FIGS. 1-4, the electric drive unit 12 includes a housing 48. The housing 48 can be an assembly of a plurality of components. For example, the housing 48 may be a die-cast aluminum housing 48 that is formed of a plurality of components. The housing 48 may house various components of the electric drive unit 12, such as the motor 14 and the transmission 44 of the electric drive unit 12.

Figure 4:
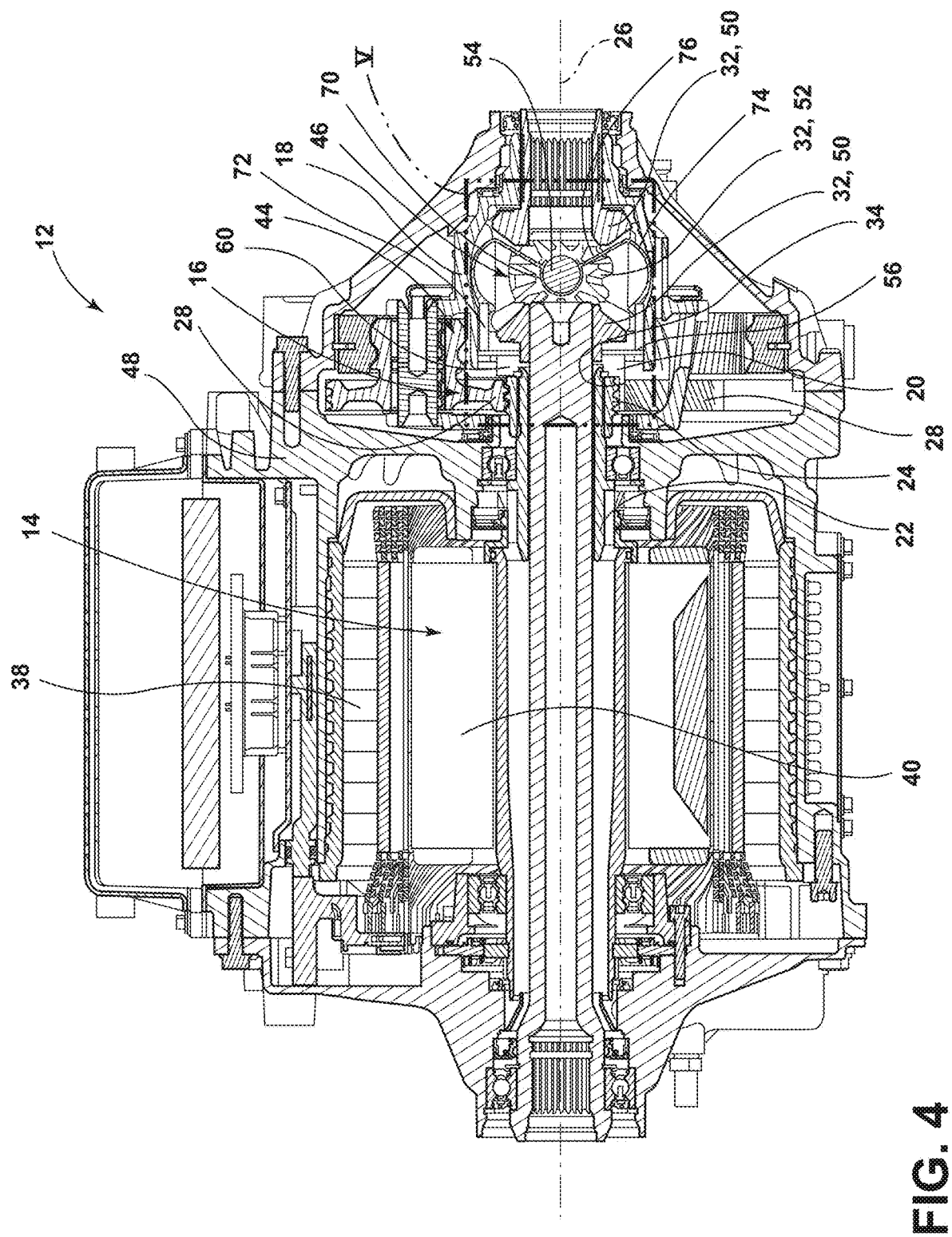
FIG. 4 is a cross-sectional view of the electric drive unit of FIG. 3 taken at line IV-IV, illustrating a motor, a transmission that includes a sun gear and a plurality of planet gears, an oil guide, a differential, and an oil distributor disposed within a differential carrier of the differential, according to one embodiment.
Figure 5:
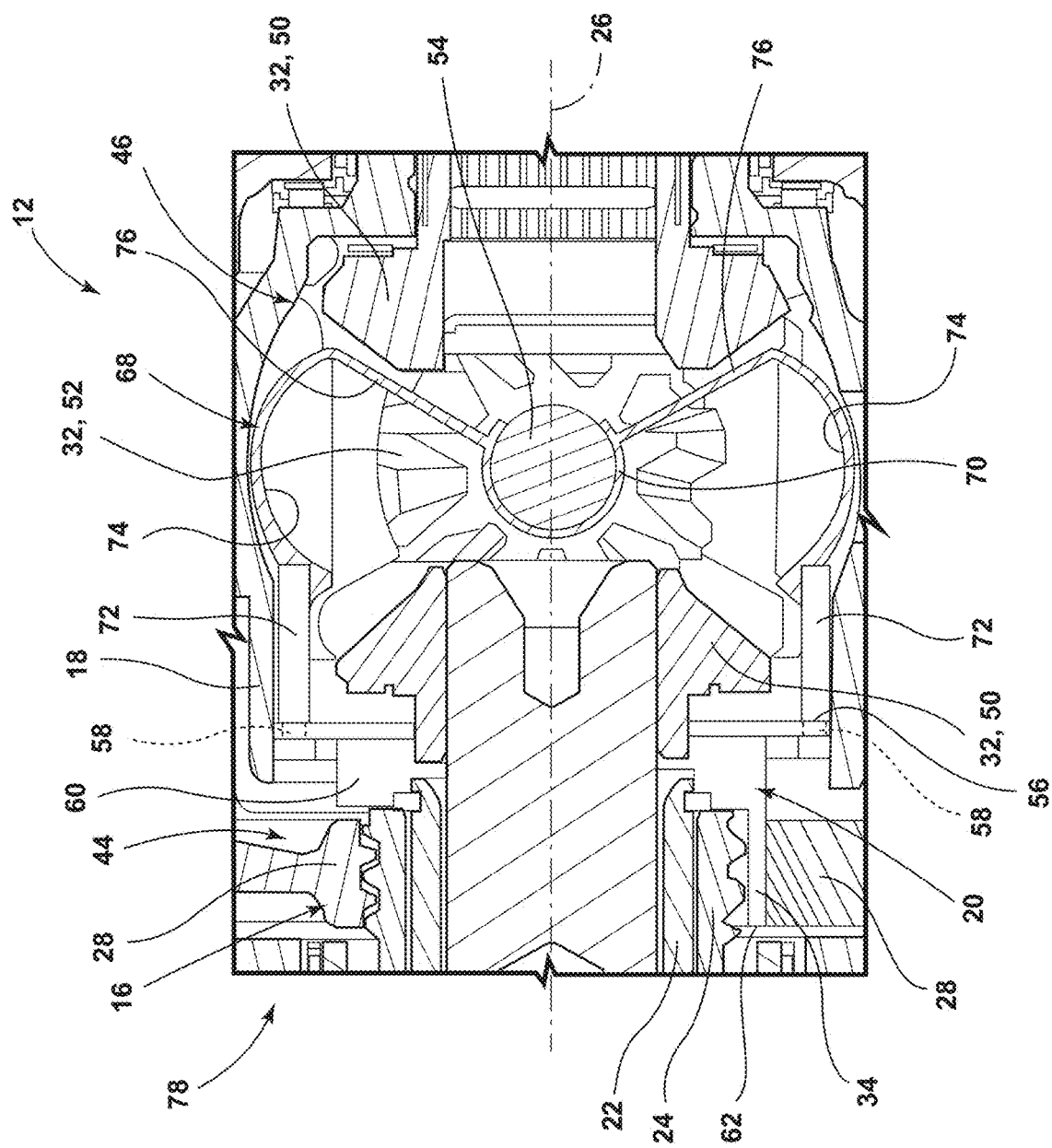
FIG. 5 is an enlarged view of area V of FIG. 4, illustrating the sun gear, the plurality of planet gears, the oil guide, and the oil distributor housed within the differential carrier of the differential, according to one embodiment.
Figure 6:
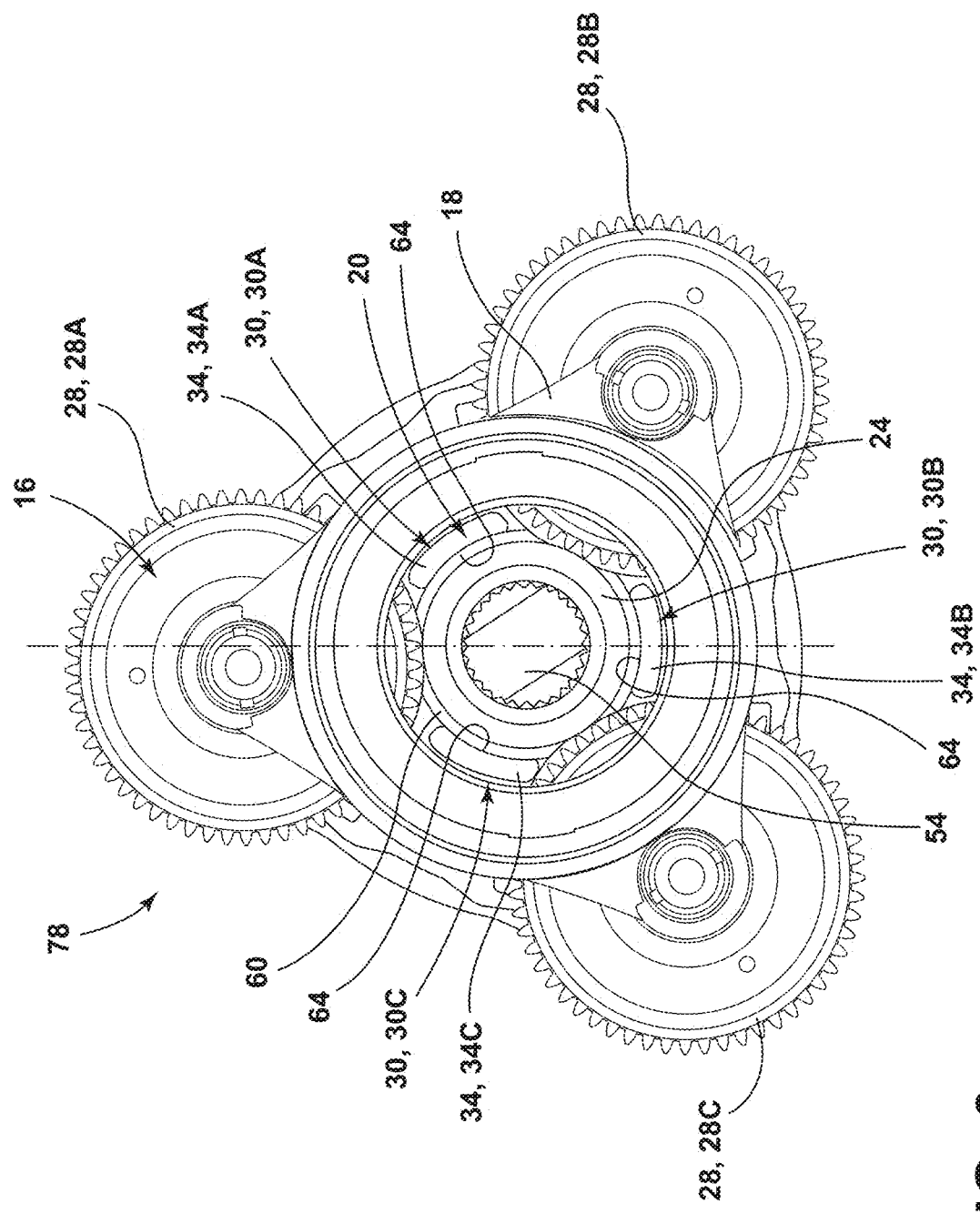
FIG. 6 is an elevational view of a portion of the electric drive unit, illustrating a planetary gearset, a differential carrier, and guide arms of the oil guide disposed circumferentially between the planet gears of the planetary gear set, according to one embodiment.

Referring now to FIGS. 4-6, the transmission 44 of the electric drive unit 12 can include the planetary gearset 16. The planetary gearset 16 includes the sun gear 24 and a plurality of planet gears 28 that interface with the sun gear 24. The sun gear 24 is operably coupled to the rotor shaft 22, as illustrated in FIGS. 4 and 5, such that the sun gear 24 and the rotor shaft 22 are configured to rotate together at a common rate of rotation about the axis 26. In operation of the electric drive unit 12, the motor 14 drives rotation of the rotor shaft 22 about the axis 26, and the plurality of planet gears 28 revolve about the axis 26 due to the geared interface between the planet gears 28 and the sun gear 24 of the planetary gearset 16. The planet gears 28 of the planetary gearset 16 are circumferentially offset from at least one adjacent planet gear 28. For example, in an exemplary embodiment of the planetary gearset 16, the planetary gearset 16 includes a first planet gear 28A and a second planet gear 28B that is circumferentially offset from the first planet gear 28A, such that a receiving space 30 is defined circumferentially between the first and second planet gears 28A, 28B.

Referring still to FIGS. 4-6, in some implementations, each of the plurality of planet gears 28 of the planetary gearset 16 is circumferentially offset from two adjacent planet gears 28, respectively, such that a plurality of receiving spaces 30 are defined circumferentially between the plurality of planet gears 28. For example, in the embodiment illustrated in FIG. 6, the planetary gearset 16 includes a first planet gear 28A, a second planet gear 28B, and a third planet gear 28C positioned circumferentially between the first and second planet gears 28A, 28B. As illustrated, the first, second and third planet gears 28A, 28B, 28C are circumferentially offset relative to each other, such that a first receiving space 30A is defined circumferentially between the first and second planet gears 28A, 28B, a second receiving space 30B is defined circumferentially between the second and third planet gears 28B, 28C, and a third receiving space 30C is defined circumferentially between the first and third planet gears 28A, 28C. As described further herein, the receiving spaces 30 defined circumferentially between adjacent planet gears 28 may receive guide arms 34 of the oil guide 20 of the electric drive unit 12 therein.

Referring still to FIGS. 4-6, the electric drive unit 12 includes the differential 46. The differential 46 includes a plurality of differential gears 32. The differential gears 32 of the differential 46 may include side gears 50 that rotate with respective half shafts of the vehicle 10 and pinion gears 52 that mesh with the side gears 50. A cross pin 54 may extend between the pinion gears 52, and the pinion gears 52 may be configured to rotate about the cross pin 54. As illustrated in FIGS. 4-6, the differential 46 includes the differential carrier 18. The differential gears 32 and the cross pin 54 of the differential 46 are housed within the differential carrier 18. The differential carrier 18 is operably coupled with the plurality of planet gears 28 of the planetary gearset 16, such that revolution of the plurality of planet gears 28 about the axis 26 rotates the differential carrier 18 about the axis 26. A differential plate 56 is coupled to the differential 46 axially between the differential gears 32 and the sun gear 24 of the planetary gearset 16. The differential plate 56 cooperates with the differential carrier 18 to house the differential gears 32 of the differential 46. The differential plate 56 defines an aperture 58. In various embodiments, the differential plate 56 defines a plurality of apertures 58. As described further herein, the apertures 58 defined by the differential plate 56 allow oil to flow axially through the differential plate 56 to lubricate the differential gears 32, as described further herein.

Referring now to FIGS. 4-9, the electric drive unit 12 includes the oil guide 20. The oil guide 20 includes a guide arm 34 that is disposed within the receiving space 30 circumferentially between planet gears 28 of the planetary gearset 16. In various implementations, the oil guide 20 includes a plurality of guide arms 34 that are disposed within the corresponding plurality of receiving spaces 30 defined between the plurality of circumferentially offset planet gears 28 of the planetary gearset 16. For example, in the embodiment illustrated in FIG. 6, the oil guide 20 includes a first guide arm 34A that is disposed circumferentially between the first and second planet gears 28A, 28B in the first receiving space 30A, a second guide arm 34B that is disposed circumferentially between the second and third planet gears 28B, 28C in the second receiving space 30B, and a third guide arm 34C that is disposed circumferentially between the first and third planet gears 28A, 28C in the third receiving space 30C. In various implementations, the oil guide 20 includes a connector ring 60, and the guide arms 34 extend from the connector ring 60 to axially distal ends 62 of the guide arms 34. As illustrated in FIGS. 4 and 5, the connector ring 60 is disposed axially between the sun gear 24 and the differential plate 56. In the illustrated embodiment, the connector ring 60 abuts the differential plate 56 and is maintained in abutment with the differential plate 56 via a retainer (e.g., retention ring). The guide arms 34 extend from the connector ring 60 to the axially distal ends 62 in an axial direction away from the differential plate 56.

Referring still to FIGS. 4-9, in various implementations, the guide arm 34 includes an inner surface 64 that is configured to intercept and convey the oil that is propelled radially outward from the sun gear 24 during operation of the electric drive unit 12. As illustrated in FIG. 6, the inner surface 64 of the guide arm 34 has a concave profile. In the embodiment illustrated in FIG. 6, the inner surfaces 64 of the first, second, and third guide arms 34A, 34B, 34C of the oil guide 20 face radially inboard and have concave profiles. The concave profile of the guide arms 34 may aid in keeping the oil on the inner surface 64 of the guide arms 34, such that the oil can be conveyed toward the differential 46.

Figure 7:
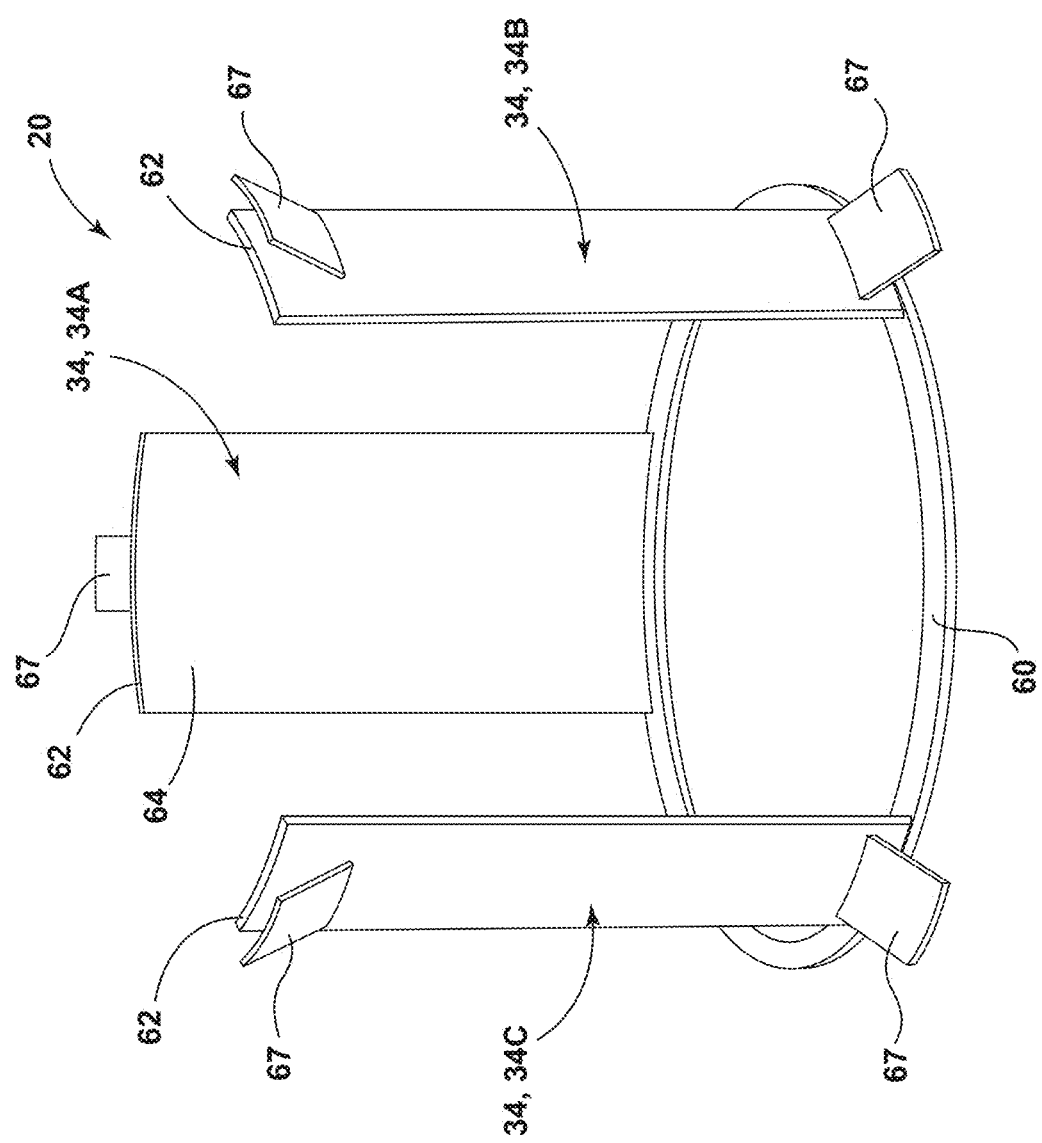
FIG. 7 is a perspective view of an oil guide, illustrating a connector ring and a plurality of guide arms that extend outward from the connector ring, according to one embodiment.
Figure 8:
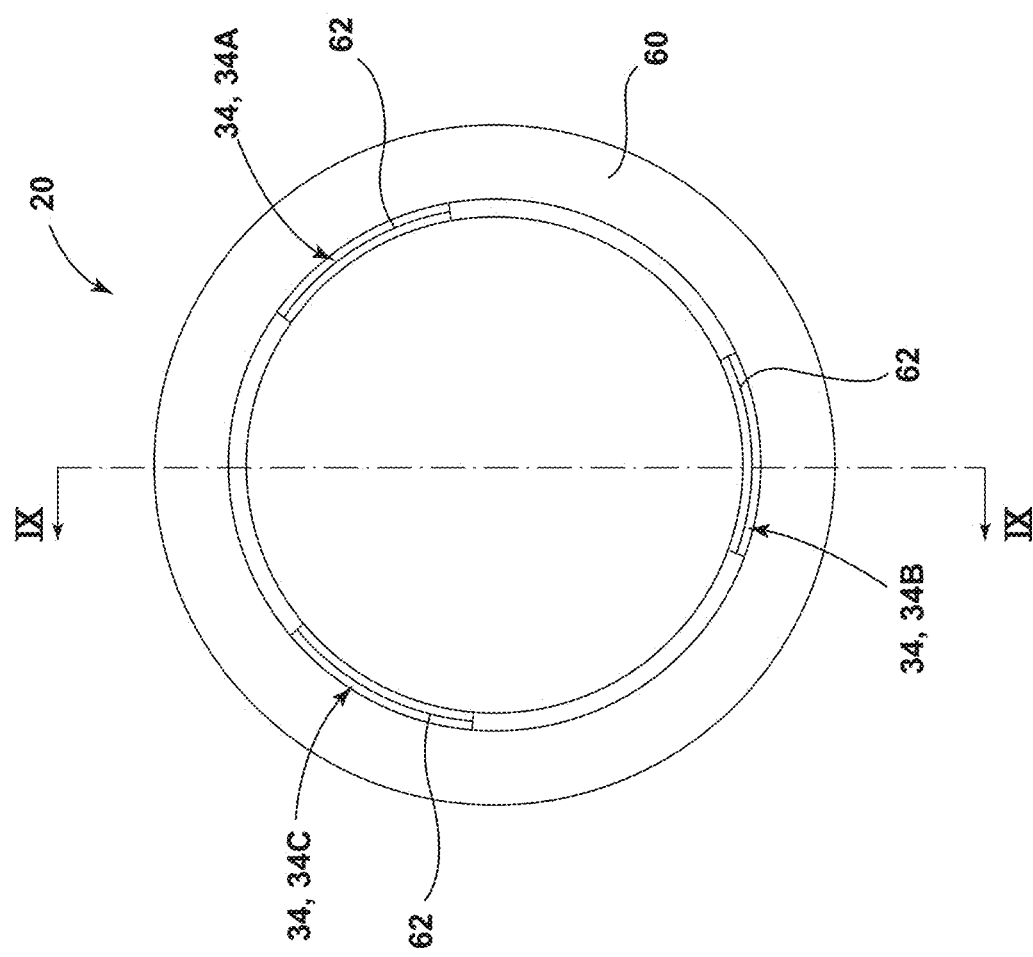
FIG. 8 is an elevational view of an oil guide, illustrating a connector ring and a plurality of guide arms that extend from the connector ring, according to one embodiment.
Figure 9:
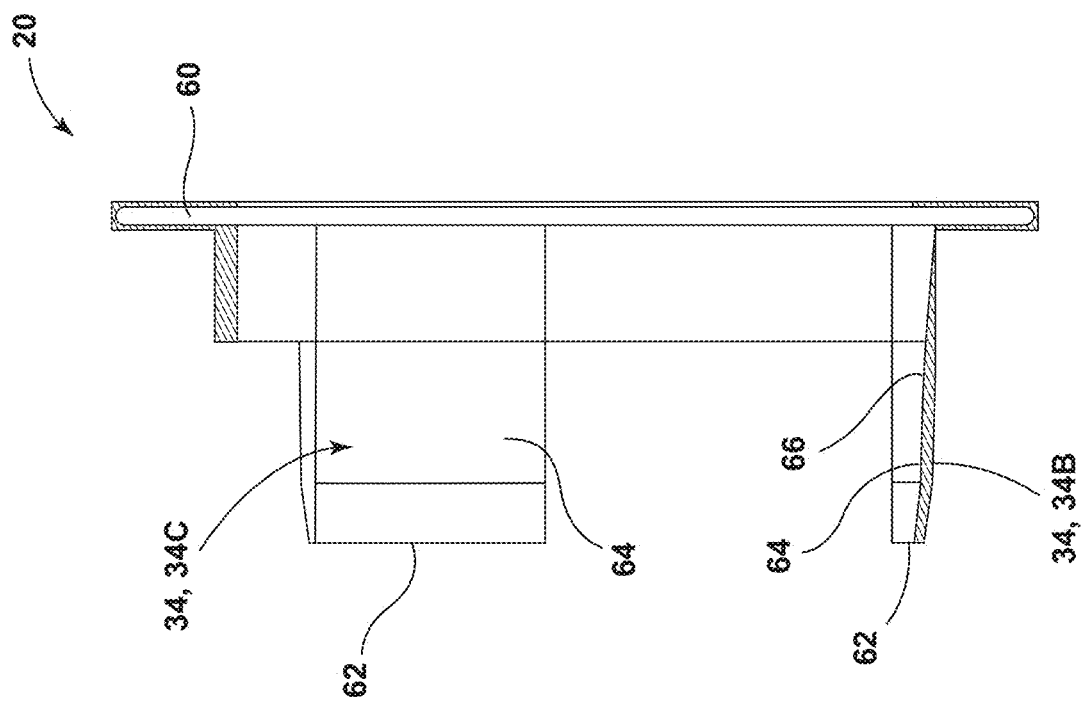
FIG. 9 is a cross-sectional view of the oil guide of FIG. 8 taken at line IX-IX, illustrating a tapered portion of an inner surface of a guide arm of the oil guide.

In various embodiments, the inner surface 64 of the guide arm 34 of the oil guide 20 includes a tapered portion 66 that tapers radially outward as the tapered portion 66 of the inner surface 64 extends axially toward the differential gears 32 of the differential 46. As illustrated in FIG. 9, the inner surface 64 of the guide arm 34 includes the tapered portion 66 that extends radially outboard as the inner surface 64 extends from the axially distal end 62 of the guide arm 34 toward the opposite axial end of the guide arm 34 that is proximate to the connector ring 60. In operation of the electric drive unit 12, the oil guide 20 rotates with the differential carrier 18, and oil that is intercepted by the inner surfaces 64 of the guide arms 34 of the oil guide 20 flows axially along the inner surfaces 64 of the guide arms 34 due to the skinning effect caused by the rotation of the oil guide 20 and the tapered nature of the inner surfaces 64 of the guide arms 34. As such, the oil flows axially toward the differential 46 along the guide arms 34 in operation of the electric drive unit 12. As illustrated in FIG. 7, the oil guide 20 can include a plurality of retention tabs 67 that are configured to retain the oil guide 20 in position with respect to the differential carrier 18. The retention tabs 67 may extend outward from the guide arms 34 and/or the connector ring 60 and may be configured to resiliently compress to fit become engaged with the differential carrier 18.

Referring now to FIGS. 4, 5, 10, and 11, the electric drive unit 12 can include an oil distributor 68. The oil distributor 68 may be housed within the differential carrier 18, as illustrated in FIGS. 4 and 5. In some implementations, the differential carrier 18 may be coupled with the cross pin 54 of the differential 46. For example, as illustrated in FIGS. 4 and 5, the oil distributor 68 includes a C-shaped retention feature 70 that is operable to resiliently expand to allow the cross pin 54 to be received within the retention feature 70 and then rebound back toward an undeformed condition wherein the retention feature 70 hugs the cross pin 54 to maintain a coupled relationship between the cross pin 54 and the oil distributor 68. In various embodiments, the oil distributor 68 is coupled to the cross pin 54 such that the oil distributor 68 is configured to rotate together with the cross pin 54 as the cross pin 54 and differential carrier 18 rotate with the revolution of the planet gears 28 of the planetary gearset 16.

Figure 10:
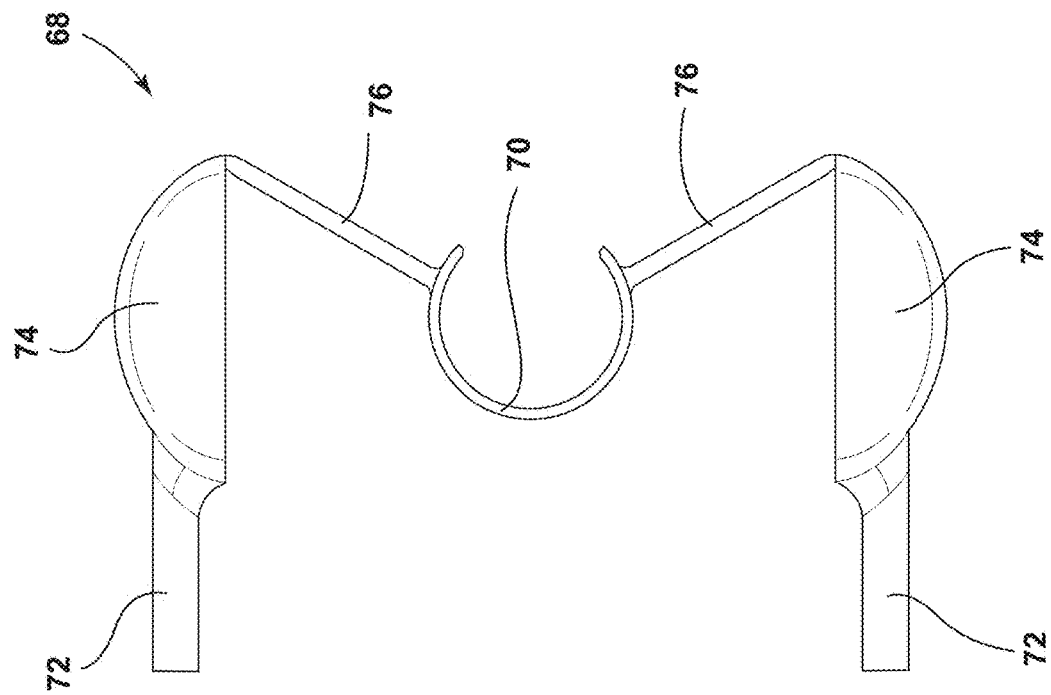
FIG. 10 is a perspective view of an oil distributor that includes a plurality of conduit portions and a plurality of collecting portions, according to one embodiment.
Figure 11:
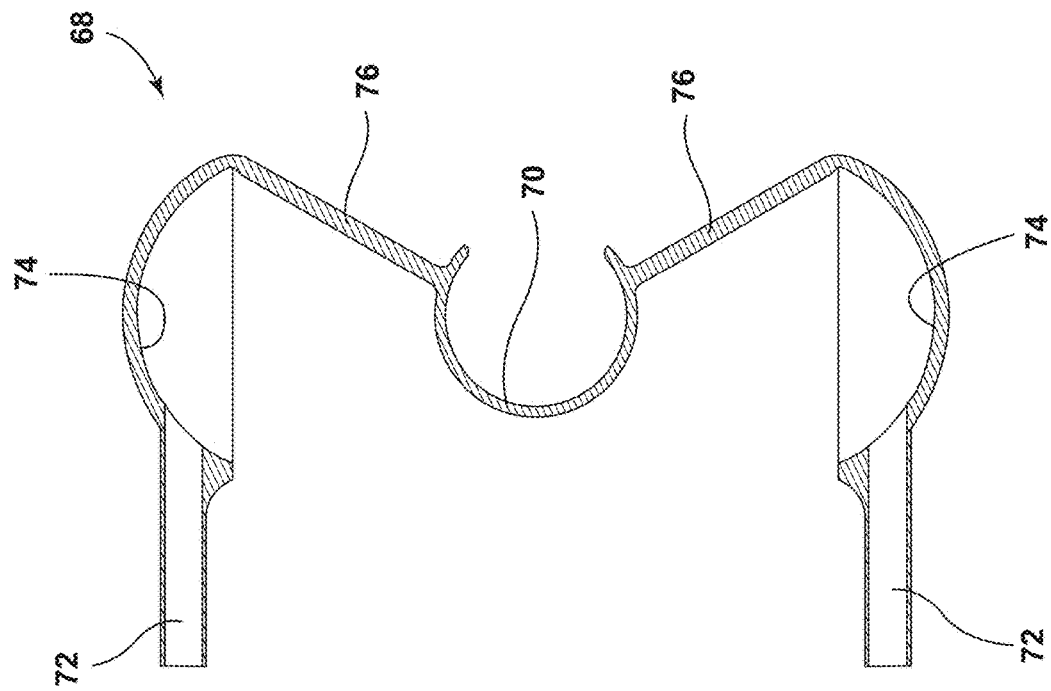
FIG. 11 is a cross-sectional view of the oil distributor, illustrating the concave shape of the collecting portions of the oil distributor, according to one embodiment.

Referring still to FIGS. 4, 5, 10, and 11, the oil distributor 68 includes a conduit portion 72 that is aligned with the aperture 58 defined by the differential plate 56. The conduit portion 72 of the oil distributor 68 may be tubular, as illustrated in FIGS. 10 and 11. In various implementations, the oil distributor 68 includes a plurality of conduit portions 72 that are aligned with a corresponding plurality of apertures 58 defined by the differential plate 56. The conduit portions 72 are configured to convey oil that flows through the corresponding apertures 58 defined by the differential plate 56 in operation of the electric drive unit 12. The differential plate 56 and the oil distributor 68 are configured to rotate in unison with rotation of the differential carrier 18, such that the oil conveyed through the apertures 58 defined by the differential plate 56 consistently flows into corresponding conduit portions 72 of the oil distributor 68.

Referring still to FIGS. 4, 5, 10, and 11, the oil distributor 68 can include a collecting portion 74. The collecting portion 74 may be positioned adjacent to the conduit portion 72 of the oil distributor 68 and may be positioned such that the conduit portion 72 of the oil distributor 68 is positioned axially between the collecting portion 74 and the differential plate 56 of the electric drive unit 12. In various implementations, the oil distributor 68 includes a plurality of collecting portions 74 that correspond with the plurality of conduit portions 72. As illustrated in FIGS. 4, 5, and 11, the collecting portion 74 of the oil distributor 68 may be generally dish-shaped with a concave surface that faces radially inward. As the oil flows out of the conduit portion 72 of the oil distributor 68 and onto the dish-shaped concave surface of the collecting portion 74, the collecting portion 74 may be configured to collect and distribute the oil to the differential gears 32 and various other components as the oil distributor 68 rotates about the axis 26 with the differential carrier 18. As illustrated in FIGS. 10 and 11, connecting members 76 extend from the collecting portions 74 of the oil distributor 68 to the retention feature 70 that is engaged with the cross pin 54 of the differential 46. It is contemplated that the oil guide 20 and the oil distributor 68 may be formed of a variety of materials and in a variety of manners. In some implementations, the oil guide 20 may be integrally formed as a single unitary body via, for example, an injection molding process. In some embodiments, the oil distributor 68 may be, likewise, an integrally formed single unitary body that is formed via, for example, injection molding.

Referring now to FIGS. 1-11, in an exemplary embodiment of the electric drive unit 12 for the vehicle 10, the electric drive unit 12 includes the planetary gearset 16, the differential 46, the oil guide 20 including a plurality of guide arms 34, and the oil distributor 68 housed within the differential carrier 18. In operation of the exemplary embodiment of the electric drive unit 12, the motor 14 drives rotation of the rotor shaft 22, which causes the sun gear 24 to rotate. Rotation of the sun gear 24 causes the planet gears 28 to revolve about the axis 26 of the rotor shaft 22 and the sun gear 24. The differential carrier 18, being operably coupled with the planet gears 28, likewise, rotates about the axis 26. Rotation of the differential carrier 18 causes the differential plate 56 and oil guide 20 in abutment with the differential plate 56 to rotate, as well as the cross pin 54 of the differential 46 and the oil distributor 68 coupled to the cross pin 54 to rotate with the differential carrier 18. With the aforementioned components of the electric drive unit 12 rotating in this manner, oil of the electric drive unit 12 flows axially along the rotor shaft 22 to the sun gear 24 coupled thereto. Upon reaching the sun gear 24, the oil is then propelled radially outboard therefrom into the receiving spaces 30 defined circumferentially between the planet gears 28 of the planetary gearset 16. The guide arms 34 that are disposed within the receiving spaces 30 intercept the oil that is propelled radially outboard from the sun gear 24 and convey the oil along the tapered portions 66 of the inner surfaces 64 of the respective guide arms 34 to the apertures 58 defined by the differential plate 56. The oil then flows through the apertures 58 and into the conduit portions 72 of the oil distributor 68 housed within the differential carrier 18 of the differential 46. The oil flows axially within the conduit portions 72 and exits into the collecting portions 74 of the oil distributor 68. As the oil distributor 68 rotates, the concave dish-like collecting portions 74 turn over, which distributes oil to the differential gears 32 and other components in need of lubrication and/or cooling.

The oil guide 20 and the oil distributor 68 have been described herein in relation to use in an electric drive unit 12 that utilizes a planetary gearset 16. However, it is contemplated that the oil guide 20 and/or the oil distributor 68 may be utilized in a transmission assembly 78 that employs a planetary gearset 16 and/or a differential 46 but is not an electric drive unit 12 for a vehicle 10 (e.g., power tools, etc.). The transmission assembly 78 may employ a carrier 18 that is not part of a differential 46 in some embodiments.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 vehicle
12 electric drive unit
14 motor
16 planetary gearset
18 differential carrier
20 oil guide
22 rotor shaft
24 sun gear
26 axis
28 planet gears
28A first planet gear
28B second planet gear
28C third planet gear
30 receiving spaces
30A first
30B second
30C third
32 differential gears
34 guide arms
34A first
34B second
34C third
36 electric axle assembly
38 stator
40 rotor
42 wheel
44 transmission
46 differential
48 housing
50 side gears
52 pinion gears
54 cross pin
56 differential plate
58 aperture
60 connector ring
62 distal ends
64 inner surface
66 tapered portion
67 retention tabs
68 oil distributor
70 retention feature
72 conduit portion
74 collecting portion
76 connecting member
78 transmission assembly

What is claimed is:

1. A vehicle, comprising:
an electric drive unit for powering movement of the vehicle, the electric drive unit comprising:
  a motor configured to drive rotation of a rotor shaft;
  a planetary gearset that includes a sun gear operably coupled to the rotor shaft, such that the sun gear and the rotor shaft are configured to rotate together at a common rate of rotation about an axis, and a plurality of planet gears that interface with the sun gear and are configured to revolve about the axis, wherein each of the planet gears is circumferentially offset from two adjacent planet gears, respectively, such that a plurality of receiving spaces are defined circumferentially between the plurality of planet gears;
  a differential carrier that houses differential gears and is operably coupled with the plurality of planet gears, such that revolution of the plurality of planet gears rotates the differential carrier about the axis; and
  an oil guide coupled to the differential carrier and having a plurality of guide arms disposed within the corresponding plurality of receiving spaces, wherein the oil guide is configured to rotate with the differential carrier and the guide arms are configured to intercept oil propelled radially outboard from the sun gear and convey the oil axially toward the differential gears housed by the differential carrier, wherein the oil guide comprises a connector ring from which the plurality of guide arms extend to axially distal ends, and wherein the connector ring is nearer than the axially distal ends of the plurality of guide arms to the differential gears.

2. The vehicle of claim 1, wherein at least one of the plurality of guide arms of the oil guide includes an inner surface that is configured to intercept and convey the oil.

3. The vehicle of claim 2, wherein the inner surface has a concave profile.

4. The vehicle of claim 2, wherein the inner surface includes a tapered portion that tapers radially outboard as the tapered portion of the inner surface extends axially towards the differential gears.

5. The vehicle of claim 1, wherein the oil guide is an integrally formed single unitary body.

6. The vehicle of claim 1, further comprising:
a differential plate coupled to the differential carrier axially between the differential gears and the sun gear and configured to cooperate with the differential carrier to house the differential gears, wherein the differential plate defines a plurality of apertures that are aligned with a corresponding plurality of guide arms, such that oil conveyed toward the differential gears by the plurality of guide arms flows through the plurality of apertures defined by the differential plate to the differential gears.

7. The vehicle of claim 6, further comprising:
an oil distributor housed within the differential carrier and coupled with a cross pin that extends within the differential carrier, such that the differential plate is positioned axially between the oil guide and the oil distributor and the oil distributor is configured to rotate with the differential carrier about the axis, the oil distributor having a plurality of conduit portions that are axially aligned with the respective plurality of apertures defined by the differential plate and a plurality of collecting portions respectively adjacent to the plurality of conduit portions, wherein the conduit portions are configured to receive oil that is conveyed through the plurality of apertures by the corresponding plurality of guide arms and convey the oil axially to the collecting portions, and the collecting portions are configured to collect and distribute the oil to the differential gears as the oil distributor rotates about the axis.

8. The vehicle of claim 1, wherein the plurality of planet gears includes a first planet gear, a second planet gear, and a third planet gear positioned circumferentially between the first and second planet gears, the plurality of receiving spaces includes a first receiving space defined circumferentially between the first and second planet gears, a second receiving space defined circumferentially between the second and third planet gears, and a third receiving space defined circumferentially between the first and third planet gears, and the plurality of guide arms include a first guide arm disposed circumferentially between the first and second planet gears in the first receiving space, a second guide arm disposed circumferentially between the second and third planet gears in the second receiving space, and a third guide arm disposed circumferentially between the first and third planet gears in the third receiving space.

9. An electric drive unit, comprising:
a motor configured to drive rotation of a rotor shaft;
a planetary gearset that includes a plurality of planet gears including a first planet gear and a second planet gear and a sun gear that interfaces with the plurality of planet gears and that is operably coupled with the rotor shaft such that rotation of the rotor shaft drives rotation of the sun gear, wherein the first and second planet gears are circumferentially offset from each other with respect to an axis of rotation of the sun gear, such that a receiving space is defined circumferentially between the first and second planet gears, and the first and second planet gears are configured to revolve about the axis of rotation of the sun gear;
a differential carrier that houses differential gears and is operably coupled with the plurality of planet gears, such that revolution of the first and second planet gears rotates the differential carrier about the axis of rotation of the sun gear;
an oil guide coupled to the differential carrier and having a guide arm disposed within the receiving space circumferentially between the first and second planet gears and configured to intercept oil propelled radially outboard from the sun gear and convey the oil axially toward the differential gears housed by the differential carrier; and
a differential plate coupled to the differential carrier axially between the differential gears and the sun gear and configured to cooperate with the differential carrier to house the differential gears, wherein the differential plate defines an aperture that is aligned with the guide arm, such that oil conveyed toward the differential gears by the guide arm flows through the aperture defined by the differential plate to the differential gears.

10. The electric drive unit of claim 9, wherein the guide arm of the oil guide includes an inner surface that is configured to intercept and convey the oil.

11. The electric drive unit of claim 10, wherein the inner surface has a concave profile.

12. The electric drive unit of claim 11, wherein the inner surface includes a tapered portion that tapers radially outboard as the tapered portion of the inner surface extends axially towards the differential gears.

13. The electric drive unit of claim 9, wherein the oil guide comprises:
a connector ring from which the guide arm extends axially, wherein the connector ring abuts the differential plate.

14. The electric drive unit of claim 13, further comprising:
an oil distributor housed within the differential carrier and coupled with a cross pin of a differential, such that the differential plate is positioned axially between the oil guide and the oil distributor and the oil distributor is configured to rotate with the differential carrier about the axis of rotation of the sun gear.

15. The electric drive unit of claim 14, wherein the oil distributor includes a conduit portion that is aligned with the aperture defined by the differential plate, the conduit portion being configured to axially convey oil received through the aperture.

* * * * *